(12) United States Patent
Hollander et al.

(10) Patent No.: US 7,307,255 B2
(45) Date of Patent: Dec. 11, 2007

(54) LASER SYSTEM

(75) Inventors: Milton Bernard Hollander, Stamford, CT (US); Shahin Baghai, Trumbull, CT (US)

(73) Assignee: White Box, Inc., Stamford, CT (US)

( * ) Notice: Subject to any disclaimer, the term of this patent is extended or adjusted under 35 U.S.C. 154(b) by 438 days.

(21) Appl. No.: 10/864,696

(22) Filed: Jun. 9, 2004

(65) Prior Publication Data

US 2004/0252731 A1    Dec. 16, 2004

Related U.S. Application Data

(60) Provisional application No. 60/478,935, filed on Jun. 16, 2003.

(51) Int. Cl.
*G01J 5/00* (2006.01)

(52) U.S. Cl. .................................. 250/338.1

(58) Field of Classification Search ............. 250/338.1, 250/330, 332, 334
See application file for complete search history.

(56) References Cited

U.S. PATENT DOCUMENTS

| | | | |
|---|---|---|---|
| 2002/0015434 A1* | 2/2002 | Hollander et al. | 374/121 |
| 2003/0128735 A1* | 7/2003 | Hollander et al. | 374/121 |
| 2004/0196888 A1* | 10/2004 | Musbach et al. | 374/120 |

\* cited by examiner

*Primary Examiner*—David Porta
*Assistant Examiner*—Mark R Gaworecki
(74) *Attorney, Agent, or Firm*—William A. Drucker

(57) ABSTRACT

An infra-red measurement device is disclosed having at least two laser emitters (2) which between them define a sighting area (7,7',7"). In one embodiment of the invention, two lasers are provided and these are each preferably split into a number of beams by means of, for example, a diffraction grating lens (4). The fact that there are two laser emitting devices, means that effectively twice the power can be utilised since the limit is per laser emitting device, and thus twice the brightness of a conventional device attained. In another embodiment of the invention, four laser emitters (2) are employed and the beams (6) can be split by a diffraction grating as before. The laser emitters in the device can be operated simultaneously, sequentially, or can be pulsed. Having greater brightness than conventional devices, the detectors of the invention are excellent for use in dark or smoky conditions, for example for obtaining the temperatures of car engines, furnaces and the like.

2 Claims, 4 Drawing Sheets

FAR FIELD OF VIEW OPTICAL / LASER SYSTEM

TWO LASER CONFIGURATION

FIG. 1   FAR FIELD OF VIEW OPTICAL / LASER SYSTEM   TWO LASER CONFIGURATION

FIG. 2   CLOSE FIELD OF VIEW OPTICAL / LASER SYSTEM   TWO LASER CONFIGURATION

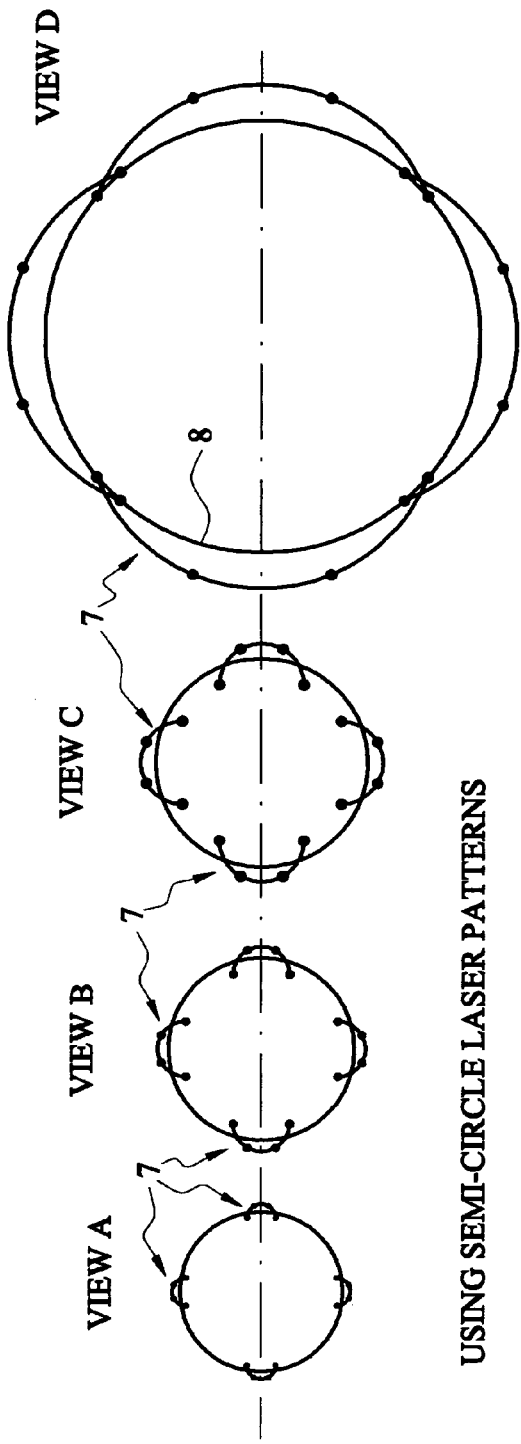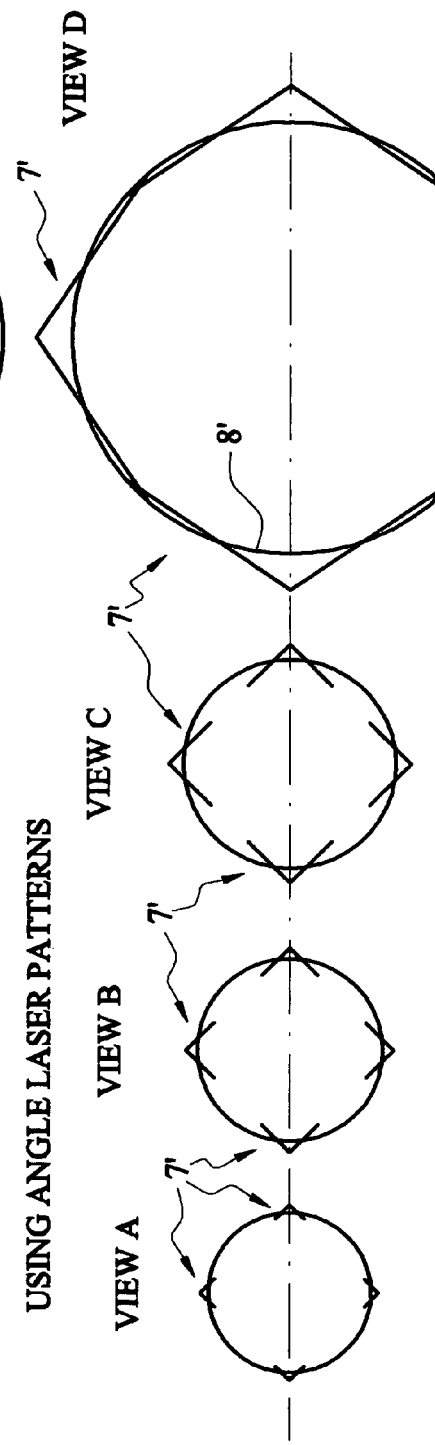
FIG. 3
FAR FIELD OF VIEW OPTICAL SYSTEM, FOUR LASER CONFIGURATION

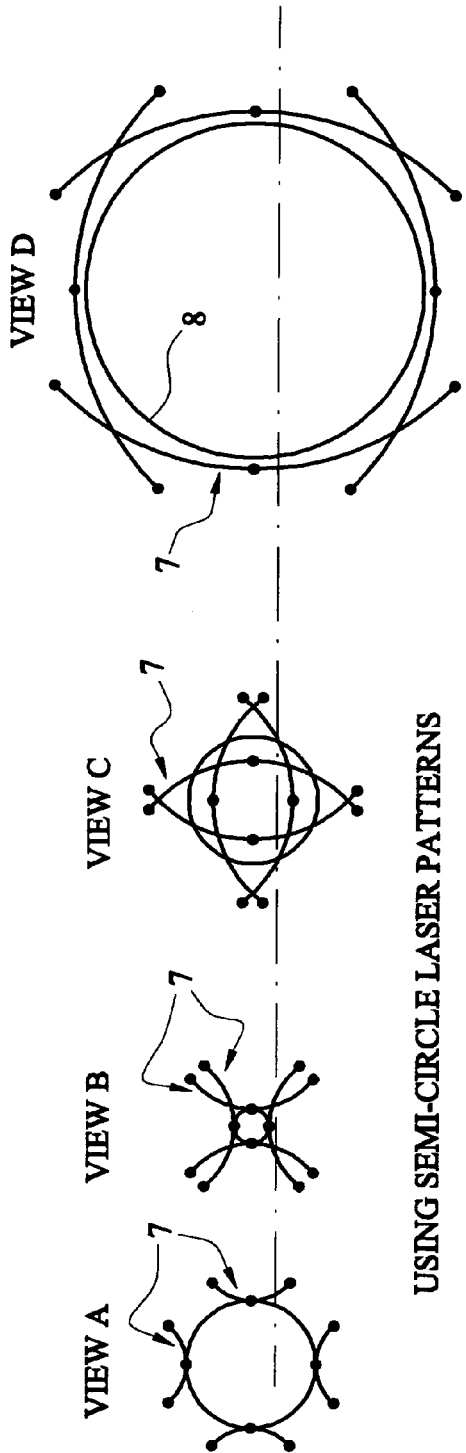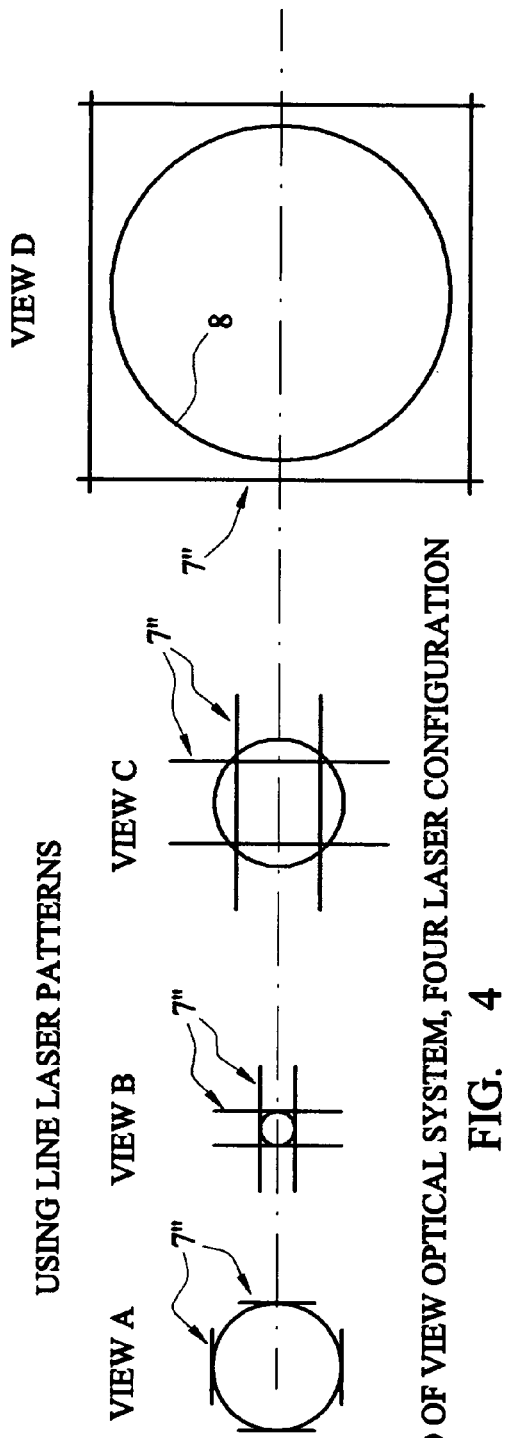
CLOSE FIELD OF VIEW OPTICAL SYSTEM, FOUR LASER CONFIGURATION
FIG. 4

LASER SYSTEM

The present case makes specific reference under 37 CFR 1.78(a) to the prior filed application of the present Applicants in the United States: No. U.S. 60/478,935 filed on Jun. 16, 2003.

This invention concerns a laser system and in particular a laser system suitable for use with an infra-red measurement device.

Infra-red measurement devices, for example, non-contact infra-red temperature measurement devices, comprise an infra-red detector and an optical system to focus the infra-red radiation from the object whose temperature is being measured onto the detector. Many of these devices are portable or hand-held and it is therefore important that the operator is able to point the device at exactly the right place so that the correct temperature is being measured. To this end, some such devices are provided with a laser emitter with which the device as a whole can be aimed. The laser beam may appear as a "spot" at the centre of the optical field, or may be split, e.g. by diffraction device, to produce a number of spots to define the measurement area in the optical field.

However, for safety reasons, there is an upper limit on the power of the laser beam which can be employed with such a device. This means that the efficiency of some of the conventional devices, when used in smoky or dark conditions, or at greater distances from the object being measured, is less than satisfactory.

The invention seeks to provide an infra-red measurement device incorporating a laser system improved in the above respects.

According to the present invention, there is provided an infra-red measurement device having a laser emitter for sighting purposes, characterised in that there are at least two laser emitters which define a sighting area.

In one embodiment of the invention, two lasers are provided and these are each preferably split into a number of beams by means of, for example, a diffraction grating, diffraction lens, prism, or other beam splitting device. The fact that there are two laser emitting devices, means that effectively twice the power can be utilised since the safety limit is per laser emitting device, and thus twice the brightness of a conventional device attained. Each beam can be split more than once, e.g. sequentially, if desired to produce more complex patterns.

In another embodiment of the invention, four laser emitters are employed and at least some of the beams can be split by diffraction grating as before.

The laser emitters in the device of the present invention can be operated simultaneously, sequentially, or can be pulsed. Having greater brightness than conventional devices, the devices of the invention are excellent for use in dark or smoky conditions, for example for obtaining the temperatures of car engines, furnaces and the like. Moreover, the greater power allows the device to be used at greater distances from the object being measured than hitherto. The devices are preferably hand-held and may conveniently be battery powered.

A preferred example of the best mode of carrying out the invention is a construction array mounted with an infra red detector on a hand held device including a plurality of individual lasers of maximum safe power linked with on-off and/or power control switching wherein, at a first switch position, power supply to the lasers is cut off; in a second switch position, all the lasers are powered on, including an unmodified beam from one or more of the lasers directed to a position at or near the centre of the detector field of view; in a third switch position at least one laser is split by a diffraction element to produce a pattern of light intensity distribution spots on the measurement area surface to indicate to the user the edge of the field of view of the infra red detector together with a central spot from another un-split beam of a different laser.

In a further example, at least three lasers are provided, one defining a central or near central un-split spot, and the others each defining one or more spots each at or near the edges of the detector's field of view.

The invention will be described further, by way of example, with reference to the accompanying drawings, in which.

FIG. 3 comprises diagrammatic representations of the field of view where four laser beams are employed in two configurations; and FIG. 4 is a similar view to FIG. 3 showing two further laser field of view configurations.

Figure 1:
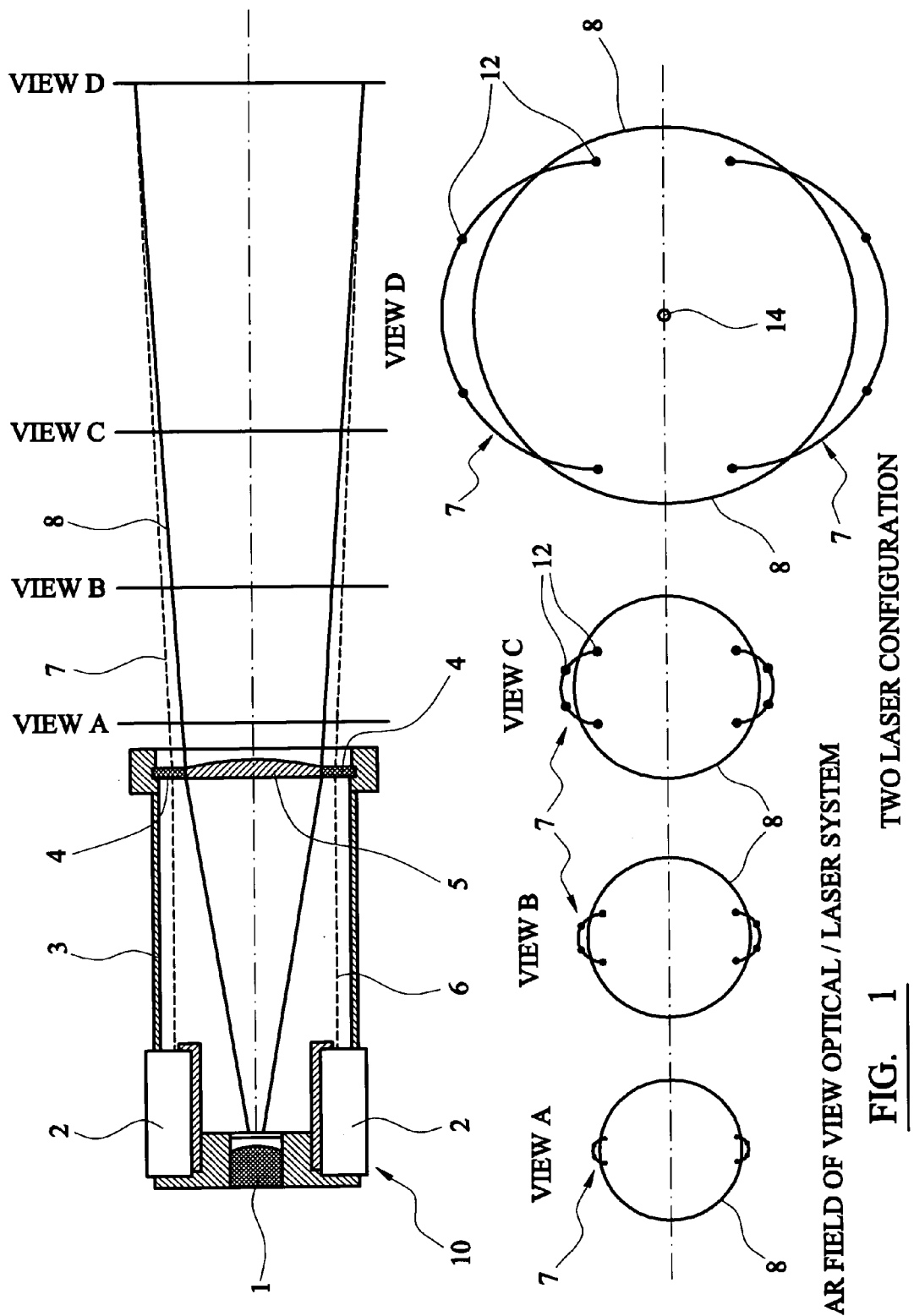
FIG. 1 is a cross-sectional view of an infra-red temperature detector having two laser emitters in accordance with the invention.
Figure 2:
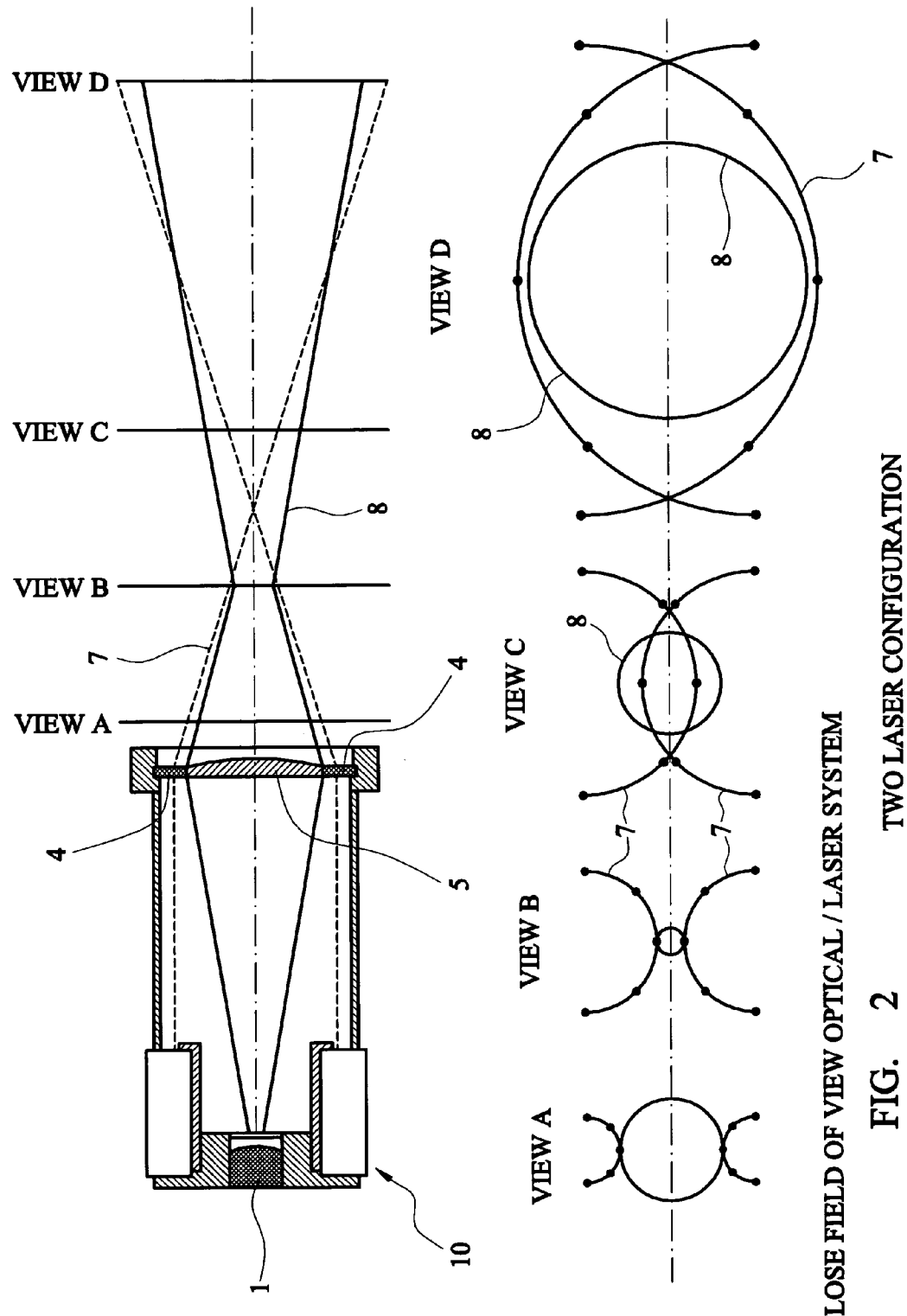
FIG. 2 is a similar view to FIG. 1, wherein the device is configured for close field of view.

Referring to the drawings, and in particular FIGS. 1 and 2, FIG. 1 illustrates a far field of view optical and laser system for an infra-red heat detection device generally designated (10). The device (10) comprises an infra-red detector (1) on which is focused infra-red radiation by means of an optical infra-red lens (5). The lens (5) is held in a lens housing (3) within which are located two laser modules (2) each producing a laser beam (6) which illuminate and pass through diffraction lenses (4).

The diffraction grating lenses (4) split each of the beams (6) into a series of dots (12) which, to the eye, form a laser envelope in the form of a semi-circle (7). The optical field of view of the detector (1) is defined by a field of view envelope (8), and it will be seen that the set up of the diffraction grating lenses is such that the laser envelope (7) matches the optical field of view envelope (8) at essentially all points along the operating range of the system as shown by the various views A, B, C and D. It will be appreciated that the optical envelope (8) is not, in practice, visible to the naked eye, whereas the laser envelopes (7) are.

In FIG. 2, the device is set up differently to give a close field of view set up where the lens (5) causes the optical field of view to take the configuration illustrated. In this case, each diffraction grating lens (4) is set up so that the semi-circular laser envelopes (7) are inverted close to the device (10) (views A and B) but progressively move towards the pattern shown in FIG. 1 at greater distances (views C and D). In each case, the operator is able to locate the centre of the optical field equidistant between the (visible) laser envelopes (7) and can thus sight the device accurately.

Referring now to FIG. 3, the device (10) (not shown) incorporates four laser modules (2) producing four laser beams which are split by the diffraction grating lenses (4) into four semi-circular laser envelopes (7), or by selection of a different diffraction grating or lens, angular laser patterns (7'). The field of view configurations in FIG. 3 are in respect of the far field of optical view system. In FIG. 4, in contrast, a close field of view optical system is illustrated with four laser beams (6) producing four sets of laser envelopes (7) which can be semi-circular as before, or linear (7") by selecting the correct configuration of diffraction grating lens (4).

In an alternative embodiment, one of the modules (2) may be focused so as to produce a spot (14) (FIG. 1) at or near the centre of the optical field of view (8). If a single (un-split) spot (14) is produced this will be brighter than the split envelopes (7) and will be visible at a substantial distance away.

The use of four laser emitters (2) quadruples the permissible power, and therefore the brightness, of the laser envelope and is especially useful in dark or smoky conditions or at greater distances from the object being measured.

It will be appreciated that configurations other than semicircles, angles, lines, and the like may be used to identify the optical field of view according to requirements. The detector of the invention provides a simple solution to the problem of brightness of the laser envelope in conditions of poor visibility or at greater distances from the object being measured.

What is claimed is:

1. A infra-red laser system measurement device having a detector and at least two separate laser sighting emitters which each separately display a laser light spot on a measurement surface at the same position to produce an overlapping spot which is brighter than a spot from each laser alone.

2. An infra-red laser system measurement device having a detector and at least two separate laser sighting emitters which display a light pattern on a measurement surface and in which the detector optical field of view is selectably switchable between either a far field or a close field of view.

* * * * *